United States Patent [19]
Kubo

[11] Patent Number: 5,513,044
[45] Date of Patent: Apr. 30, 1996

[54] RESETTING MECHANISM FOR ELECTRONIC THEODOLITE

[76] Inventor: Akio Kubo, 655, Yamanouchi Kamakura shi Kanagawa ken, Japan

[21] Appl. No.: 163,305

[22] Filed: Dec. 6, 1993

[51] Int. Cl.⁶ ............................ G02B 15/14; G02B 23/08
[52] U.S. Cl. ........................ 359/704; 359/399; 359/406; 359/702
[58] Field of Search ...................... 359/399, 401, 359/402, 405, 429, 430, 431, 811, 823, 827–830, 694–706, 813, 823; 356/146, 138, 140, 142, 147; 33/121–124, 293, 299, 281

[56] References Cited

U.S. PATENT DOCUMENTS 3,782,808   1/1974   Hohl et al. ........................... 359/405

Primary Examiner—Thong Q. Nguyen
Attorney, Agent, or Firm—David O'Reilly

[57] ABSTRACT

A resetting mechanism for an electronic theodolite of the present invention is comprised of a horizontal shaft for vertically turning a telescope, a first cam provided at one end of the horizontal shaft, and a lock lever limited by the first cam. A second cam is locked or released by the lock lever, and operates a lock member. A lock concave provided on the telescope is locked by the lock member when the telescope is turned to a fully down, locked position. Also an encoder is set to a zero position when the telescope is turned to a fully down, locked position.

2 Claims, 3 Drawing Sheets

RESETTING MECHANISM FOR ELECTRONIC THEODOLITE

BACKGROUND OF THE INVENTION

1. Field of the Invention

The present invention relates to an electronic theodolite, and more particularly to a resetting mechanism therefore.

2. Background Information

To set a reference position of the telescope of the usual electronic theodolites on a vertical plane, the telescope is first directed just above the desired setting. The telescope is then turned in the desired direction before an elevation angle or depression angle is measured. However, a problem with the usual apparatus is that it is hard to reset and a high degree of skill is needed.

BRIEF DESCRIPTION OF THE INVENTION

To solve the above mentioned problem, it is an object of the present invention to provide an electronic theodolite that a zero setting is already made at the start of use.

The resetting mechanism for an electronic theodolite according to the present invention comprises a horizontal shaft to vertically turn a telescope, a first cam provided at one end of the horizontal shaft, a lock lever whose position is limited by the first cam, a second cam locked or released by the lock lever, a lock member operated by a second cam, and an encoder set to a zero position when the telescope is turned down to a locked position.

The telescope has a lock concave which is locked at a zero position by a lock member, and the first cam has a projection portion which presses the lock lever when the telescope is turned down.

The second cam has a step which is locked by the lock lever when the lock lever is operated by a first cam, a cam portion which presses a lock member at the same time, an interlocking mechanism which turns a power switch of the whole theodolite apparatus on or off and a handle.

The lock member has a projection portion which is inserted into the lock concave of the telescope when it is pressed by the second cam.

Other objects and advantages of the invention will become more apparent from the following portion of this specification, and the accompanying drawings.

The above and other novel features of the invention will be more fully understood from the following detailed description and the accompanying drawings, in which:

DETAILED DESCRIPTION OF THE INVENTION

A front side of a main body of the theodolite according to the present invention is U-shaped. The U-shaped main body has horizontal shaft 2 held at upper portions of two sides thereof, Telescope 1 is held by horizontal shaft 2 and is able to turn in a vertical plane.

The main body is connected with a front panel thereunder. The front panel has function switches and indicators arranged thereon, the detailed description of which is omitted here.

Figure 3:
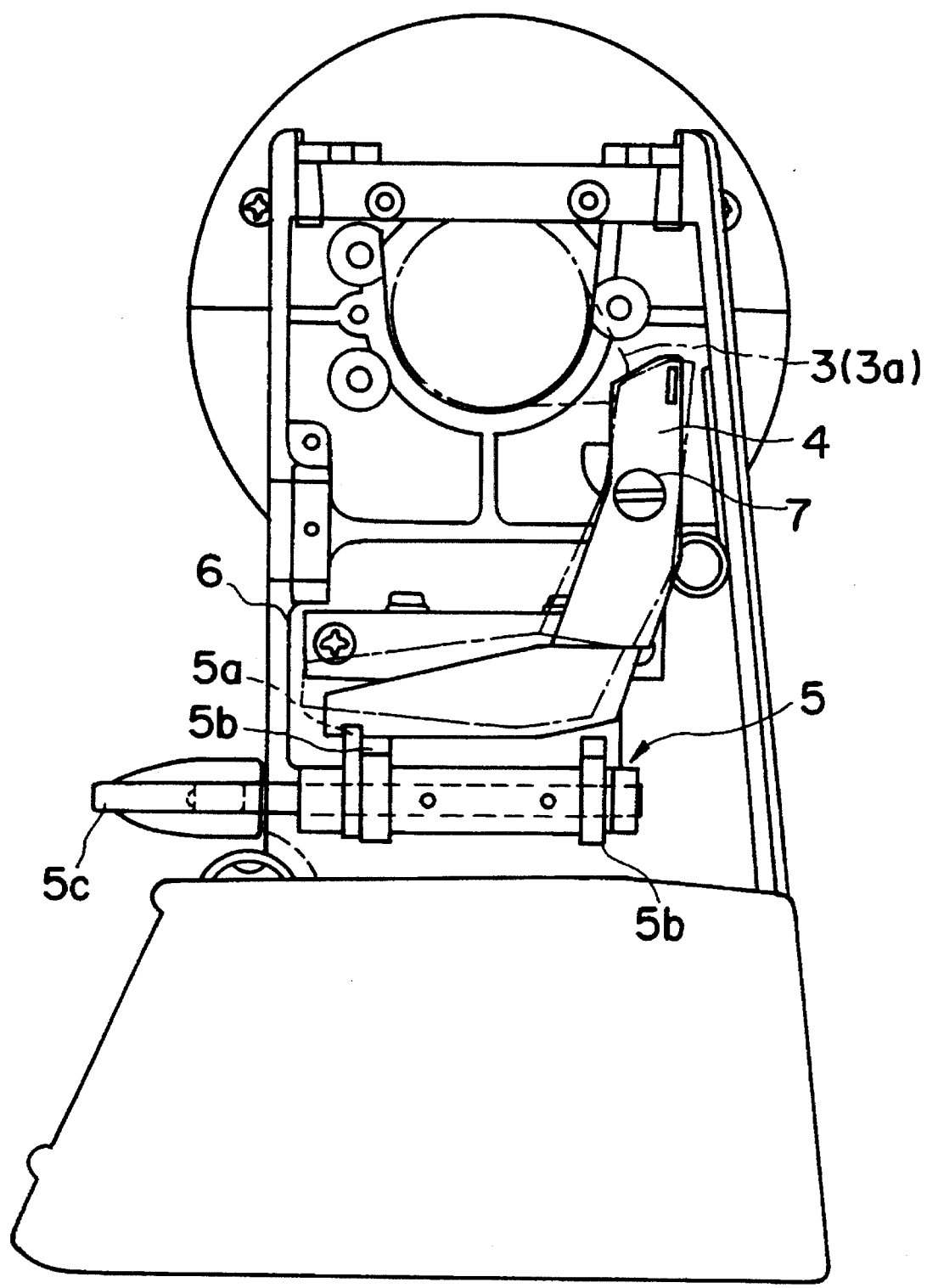
FIG. 3 is a side view of the electronic theodolite according to the present invention, with a cover for the telescope and upper portion omitted with the dotted line illustrating the housed position, and the solid line illustrating the activated position.

The main body has first cam 3 provided on one inside wall. First cam 3 is fixed at an end of horizontal shaft 2. Turning shaft 7 is held obliquely below first cam 3. L-shaped lock lever 4 is turnably held by turning shaft 7. An upper end of lock lever 4 is positioned so it can be pressed by projection 3a (FIG. 3) of first cam 3 and retreats.

A lower end of lock lever 4 is selectively positioned so that lock lever 4 can lock or release second cam 5 which will be described below, however, the lower end is biased to lock second cam 5 by spring 8.

Second cam 5 has a horizontal center shaft extending parallel to the side wall of the main body. Also, second cam 5 has cam portions 5b at both ends thereof to press or release lock member 6 which will be described below, and cam sides 5d. Front cam portion 5b has step 5a so that it can be locked by the lower end of lock lever 4. Second cam 5 also has handle 5c provided outside of the front side of the main body.

Lock member 6 has fixing portion 6a to mount it on the main body, spring piece 6b, the top of which is fixed on fixing portion 6a, and projecting portion 6c provided at the center of spring piece 6b to project into the inner space defined by the U-shaped main body.

Spring piece 6b has a width that it allows it to be operated by both cam portions 5b of second cam 5. The projecting end of projection portion 6c is slightly tapered so it can easily fit into lock concave 1a of telescope 1 provided at a position corresponding to projection portion 6c of lock member 6. When projection portion 6c is completely inserted into lock concave 1a, telescope 1 is held at a zero position and a reset error is substantially zero.

Also, lock member 6 is formed so that it can turn a power switch on or off together with an interlocking mechanism (not shown) of second cam 5, simultaneously with the operation of lock member 6.

Figure 1:
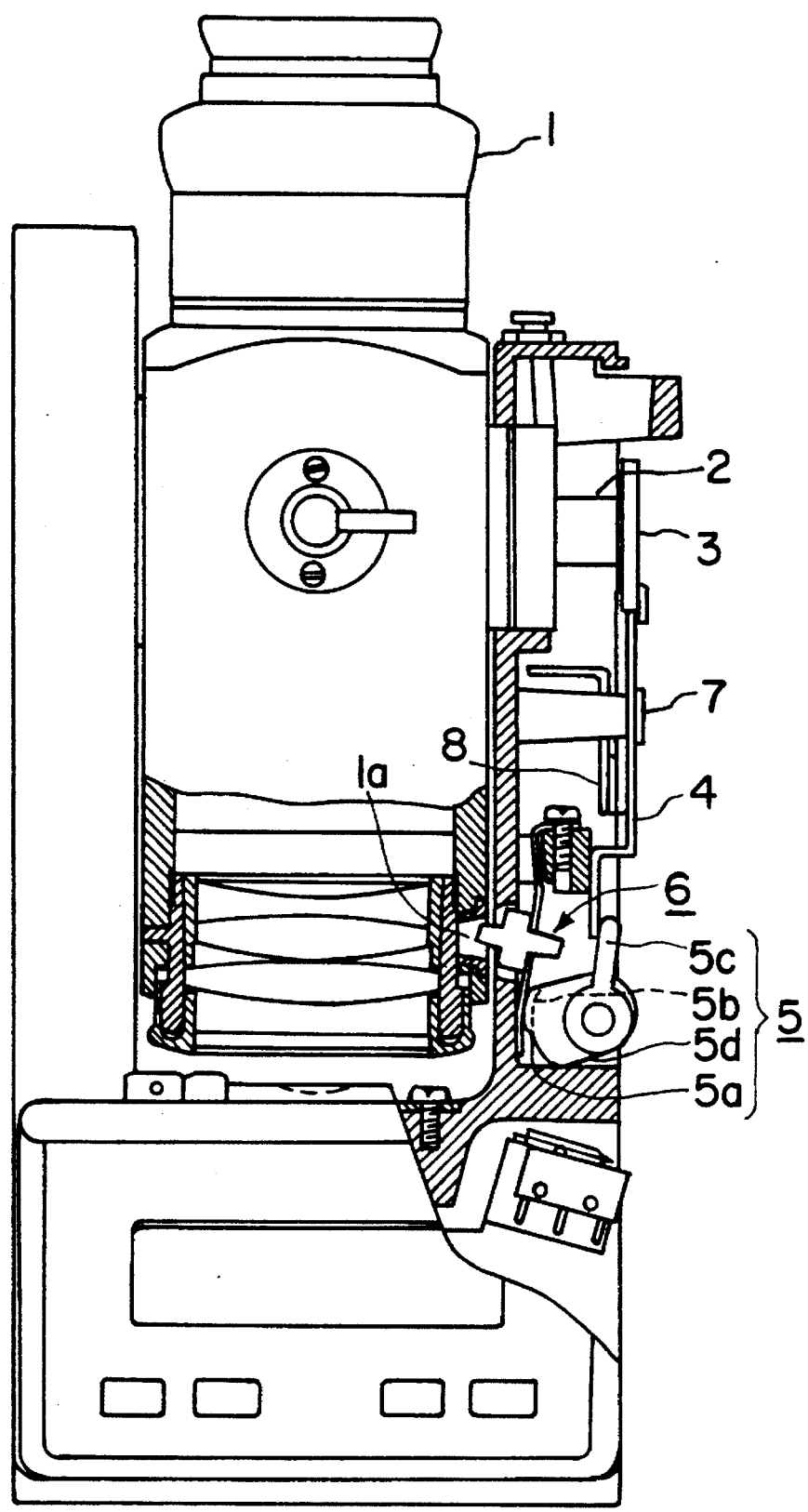
FIG. 1 is a partially cross-sectioned front view of a locked electronic theodolite according to the present invention.
Figure 2:
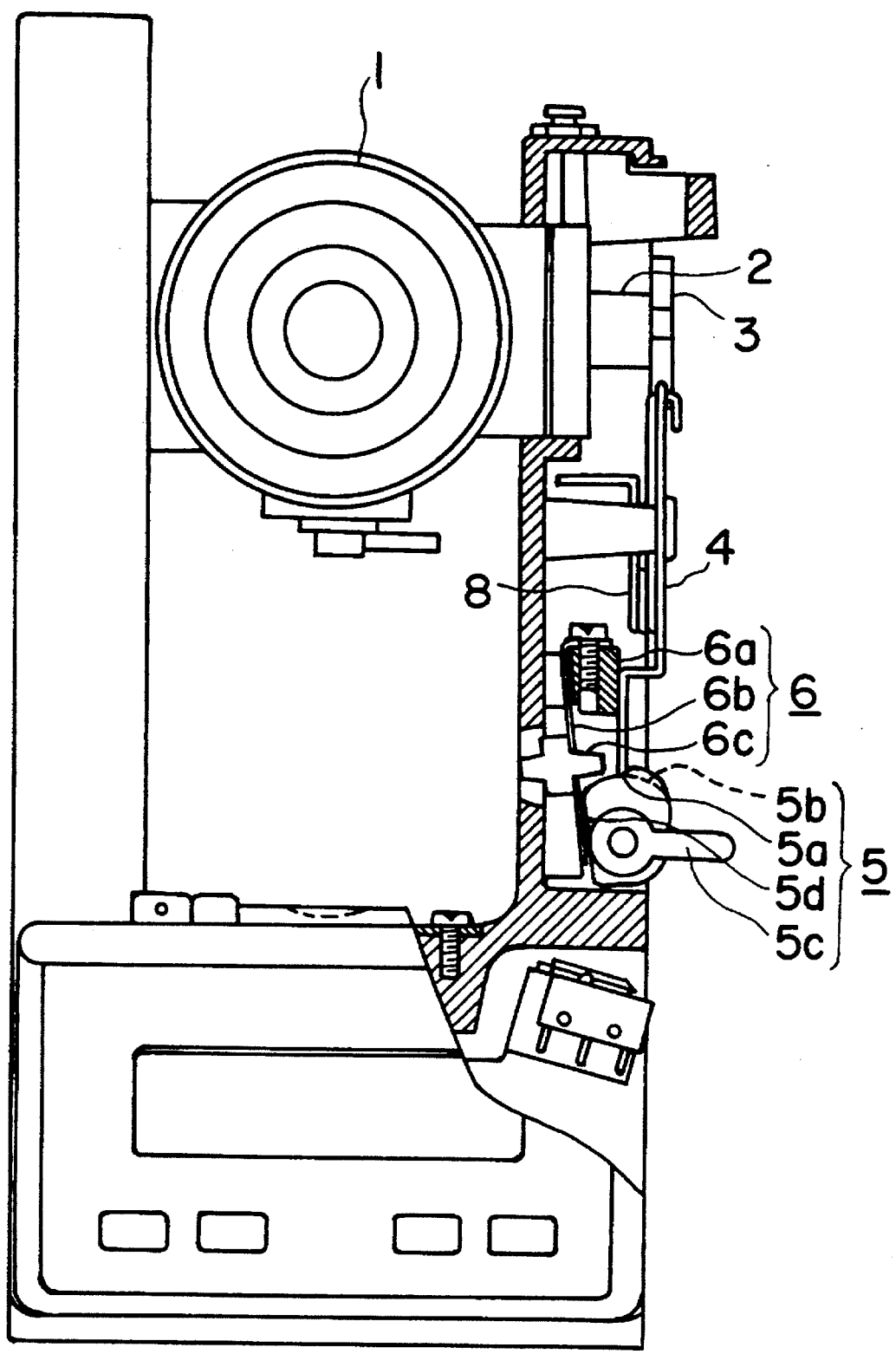
FIG. 2 is a partially cross-sectioned front view of the electronic theodolite according to the present invention, with a telescope being held horizontally in use.

In turn, the following describes the operation of the resetting mechanism according to the present invention. FIG. 1 shows the theodolite in a house state. If the theodolite is turned 180° from the housed state, it is set at a reference position. Therefore, when the theodolite is in the housed state, it should indicate 180°.

In the housed state, projection portion 3a of first cam 3 fixed on horizontal shaft 2 of telescope presses the upper end of lock lever 4.

The lower end of lock lever 4, therefore, is out of step 5a of second cam 5 and second cam 5 is turned fully counterclockwise. In this state, the power switch is off and lock member 6 is pressed by cam portion 5b of second cam 5 and projection portion 6c is inserted into lock concave 1a of telescope 1. Therefore, telescope 1 is secured all the way down. An encoder (not shown) is set to a zero position by lock member 6.

If handle 5c of second cam 5 is turned 90 degrees clockwise from the housed state, the power is turned on. At the same time, cam portion 6b releases spring piece 6b of lock member 6 and spring piece 6b pressed cam side 5d. This limits turning of second cam 5. The theodolite enters a measurement ready state.

At this position, projection portion 6c of lock member 6 is fully retracted inside of the main body and out of concave lock recess 1a of telescope 1. Telescope 1 can be freely turned. At the same time, second cam 5 can be locked by lock lever 4. However, it should be noted that locking is not yet done in this state.

When telescope 1 is directed in the direction of an object, the encoder which was reset in the locked position described above, provides an angle signal to an operating means which converts the angle to an angle from directly overhead to the direction of the object and the indicator shows the converted angle. At the same time, projection portion 3a of first cam 3 fixed on horizontal shaft 2 of telescope 1 releases the top end of lock lever 4. The lower end of lock lever 4 locks step 5a of second cam 5 using a restoring force of spring 8.

To house the theodolite after measurement, telescope 1 is turned downward, and projection portion 3a of first cam 3 presses on the top of lock lever 4 to lift the lower end of lock lever 43 against the restoring force of spring 8, thereby releasing second cam 5.

In turn, if second cam 5 is turned counterclockwise, the power switch is turned off. At the same time, cam portion 5b presses spring piece 6b of lock member 6 to extend projection piece 6c. Projection piece 6c engages lock concave 1a of telescope 1, thereby holding telescope 1 all the way down.

Even if the telescope deviates a little, it can be corrected and set completely down by the tapered end of projection piece 6c in this state.

As described so far, telescope 1 can be reset whenever it is housed after measurement. Telescope does not need to be reset at start-up.

While the principles of the invention have been described above in connection with specific embodiments, and particular modifications thereof, it is to be clearly understood that this description is given only by way of example and not as a limitation on the scope of invention.

This invention is not to be limited by the embodiment shown in the drawings and described in the description which is given by way of example and not of limitation, but only in accordance with the scope of the appended claims.

What is claimed is:

1. A resetting mechanism for an electronic theodolite comprising: horizontal shaft means for vertically rotating a telescope; a first cam provided at one end of the horizontal shaft; a lock lever, the first cam limiting the position of the lock lever; a second cam locked or released by the lock lever; a lock member operated by the second cam; means for resetting a telescope's position when the telescope is rotated to a fully down locked position; the telescope having a concave locking recess for locking it in the reset position by the lock member, the first cam having a projection portion contoured to press the lock lever when the telescope is turned fully down; the second cam having a stepped portion locked by the lock lever when the lock lever is not pressed by the first cam, a cam portion on said second cam which presses the lock member when said second cam is rotated; and means for turning on or off a power switch of the electronic theodolite in accordance with a rotation of said second cam; the lock member having a projection piece for engaging the concave lock recess of the telescope when the lock member is pressed by the second cam.

2. An electronic theodolite resetting mechanism comprising: a telescope horizontal shaft means supporting a telescope for vertical rotation; a first cam on one end of said horizontal shaft means; a locking lever, the first cam limiting locking lever movement; a second cam; said second cam being locked or released by said locking lever; a lock member operated by said second cam; means for resetting a telescope's position when said telescope is in a fully down, locked position; a concave locking recess in said telescope for locking it at the reset position with said lock member; a projection on said first cam adapted to press said lock lever when said telescope is turned to a fully down locked position; said second cam having a stepped portion; said lock lever engaging said stepped portion to lock said second cam when said lock lever is not pressed by said first cam; pressing cam means on said second cam pressing said lock member; means on said second cam for turning a power switch of said theodolite on and off; a projection on said lock member for engaging said concave lock recess on said telescope when said lock member is pressed by said second cam to hold said telescope in a fully down locked position.

* * * * *